(12) United States Patent
Hu

(10) Patent No.: US 11,587,584 B1
(45) Date of Patent: Feb. 21, 2023

(54) SLIDER AIR BEARING DESIGN WITH ULTRA-LOW PRESSURE FOR LOW POWER-CONSUMPTION DATA STORAGE DEVICES

(71) Applicant: Western Digital Technologies, Inc., San Jose, CA (US)

(72) Inventor: Yong Hu, San Ramon, CA (US)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/652,918

(22) Filed: Feb. 28, 2022

(51) Int. Cl.
*G11B 5/48* (2006.01)
*G11B 5/60* (2006.01)

(52) U.S. Cl.
CPC .............. *G11B 5/4826* (2013.01); *G11B 5/60* (2013.01)

(58) Field of Classification Search
CPC ... G11B 5/1871; G11B 5/6082; G11B 5/6005; G11B 5/60; G11B 5/6064
See application file for complete search history.

(56) References Cited

U.S. PATENT DOCUMENTS

| | | | | |
|---|---|---|---|---|
| 5,079,657 A * | 1/1992 | Aronoff | ............... | G11B 5/6005 |
| 6,040,965 A * | 3/2000 | Terunuma | ............... | B82Y 25/00 |
| 6,104,571 A * | 8/2000 | Kabasawa | ............... | G11B 21/21 |
| | | | | 360/236.4 |
| 6,125,004 A * | 9/2000 | Katase | ................. | G11B 5/3106 |
| 6,212,042 B1 * | 4/2001 | Gui | ...................... | G11B 5/6005 |
| | | | | 360/236.8 |
| 6,683,747 B2 | 1/2004 | Bernett | | |
| 7,106,556 B2 * | 9/2006 | Pendray | ............... | G11B 5/6005 |
| 8,300,360 B2 * | 10/2012 | Bandic | ................. | G11B 5/6005 |
| | | | | 360/235.4 |
| 8,611,051 B1 * | 12/2013 | Hanyu | ................. | G11B 5/6082 |
| | | | | 360/236.3 |
| 8,638,524 B2 | 1/2014 | Brown | | |
| 8,810,967 B2 | 8/2014 | Ramakrishnan et al. | | |
| 9,082,441 B1 * | 7/2015 | Hu | ....................... | G11B 5/6082 |
| 9,691,422 B1 * | 6/2017 | Hu | ....................... | G11B 5/6005 |

(Continued)

FOREIGN PATENT DOCUMENTS

EP        1498878 A3        6/2006

OTHER PUBLICATIONS

Aravind N. Murthy et al., "Analysis of Surface Textured Air Bearing Sliders with Rarefaction Effects," Tribology Letters, 28:251-261, Oct. 2007.

(Continued)

*Primary Examiner* — Brian E Miller

(57) ABSTRACT

Disclosed herein are sliders with deep holes, data storage devices including such sliders, and methods of manufacturing such sliders. The holes can be situated near the edges of the slider to improve the stability and/or damping of the slider. The holes may be created, for example, using ion milling. In some embodiments, a slider comprises a leading pad comprising a first medium-facing surface that includes at least a first hole and a second hole, a first side pad comprising a second medium-facing surface that includes at least a third hole, and a second side pad comprising a third medium-facing surface that includes at least a fourth hole. In some embodiments, a trailing pad of the slider comprises a fourth medium-facing surface that includes at least a fifth hole and a sixth hole.

23 Claims, 7 Drawing Sheets

(56) References Cited

U.S. PATENT DOCUMENTS

| | | | |
|---|---|---|---|
| 10,354,685 B1* | 7/2019 | Hu | G11B 5/1871 |
| 10,468,059 B1 | 11/2019 | Liu | |
| 10,984,828 B1* | 4/2021 | Huang | G11B 5/4826 |
| 2002/0051316 A1* | 5/2002 | Boutaghou | G11B 5/6005 360/236.5 |
| 2002/0075600 A1* | 6/2002 | Schnur | G11B 5/6082 360/235.8 |
| 2002/0089790 A1* | 7/2002 | Stoebe | G11B 5/6082 360/235.8 |
| 2002/0191340 A1* | 12/2002 | Chapin | G11B 5/6005 360/235.8 |
| 2003/0137773 A1* | 7/2003 | Polycarpou | G11B 5/6005 360/235.8 |
| 2004/0264053 A1* | 12/2004 | Pendray | G11B 5/54 |
| 2005/0280943 A1 | 12/2005 | Inoue et al. | |
| 2009/0284869 A1* | 11/2009 | Bandic | G11B 5/6005 360/235.4 |
| 2009/0310258 A1 | 12/2009 | Hanyu et al. | |
| 2010/0091406 A1* | 4/2010 | Huang | G11B 5/6005 360/235.4 |
| 2010/0149692 A1* | 6/2010 | Fujimaki | G11B 5/6005 360/235.8 |
| 2012/0154953 A1* | 6/2012 | Dorius | G11B 5/6076 |
| 2018/0068687 A1* | 3/2018 | Yamane | G11B 5/6082 |
| 2020/0312357 A1* | 10/2020 | Hu | G11B 5/6082 |

OTHER PUBLICATIONS

Hong Rui Ao et al., "Analysis of Pressure Distribution on Head Disk Air Bearing Slider Involved Van der Waals Force," Applied Mechanics and Materials (vol. 419), pp. 111-116, Oct. 2013.

\* cited by examiner

SLIDER AIR BEARING DESIGN WITH ULTRA-LOW PRESSURE FOR LOW POWER-CONSUMPTION DATA STORAGE DEVICES

BACKGROUND

Data storage systems are used to store large amounts of information. A data storage system typically includes a read/write transducer for retrieving and storing information. Some data storage systems use rotating storage devices, such as rotating optical devices (e.g., CD and DVD drives) or hard disk drives containing rotating magnetic disks (also referred to as platters or media). In some such data storage systems, a suspended slider supports a head that includes the read/write transducer. The slider provides mechanical support for the head and the electrical connections between the head and the rest of the data storage system.

When the data storage system is in operation, the slider floats a small distance above the recording medium (e.g., a hard disk in a hard disk drive), which rotates at high speeds. Components of the data storage system move the slider and, therefore, the head to a desired radial position over the surface of the rotating medium, and the head reads or writes information. The slider rides on a cushion or bearing of air or gas created above the surface of the medium as the disk rotates at its operating speed. The slider has an air-bearing surface (ABS) that faces the medium. The ABS is designed to generate an air-bearing force that counteracts a preload bias that pushes the slider toward the medium. The ABS causes the slider to fly above and out of contact with the medium.

Spinning disks in hard disk drives at high revolutions per minute against the friction of an air atmosphere is largely inefficient and requires a certain amount of power. Accordingly, there is an ongoing need for improvements.

SUMMARY

This summary represents non-limiting embodiments of the disclosure.

In some aspects, the techniques described herein relate to a slider, including: a leading pad including a first medium-facing surface, a first side pad including a second medium-facing surface, a second side pad including a third medium-facing surface, and a trailing pad including a fourth medium-facing surface, wherein: the first medium-facing surface includes at least a first hole and a second hole, the second medium-facing surface includes at least a third hole, and the third medium-facing surface includes at least a fourth hole.

In some aspects, the techniques described herein relate to a slider, wherein: the second medium-facing surface further includes at least a fifth hole, and the third medium-facing surface further includes at least a sixth hole.

In some aspects, the techniques described herein relate to a slider, wherein the first medium-facing surface further includes at least a seventh hole and an eighth hole.

In some aspects, the techniques described herein relate to a slider, wherein the first hole has a first depth, the second hole has a second depth, the third hole has a third depth, and the fourth hole has a fourth depth, and wherein each of the first depth, second depth, third depth, and fourth depth is at least 50 nm.

In some aspects, the techniques described herein relate to a slider, wherein the fourth medium-facing surface includes at least a fifth hole and a sixth hole.

In some aspects, the techniques described herein relate to a slider, wherein a perimeter of a least one of the first hole or the second hole is larger than a perimeter of at least one of the fifth hole or the sixth hole.

In some aspects, the techniques described herein relate to a slider device, wherein: the first hole is closer to a first side-edge surface than to a second side-edge surface, and the second hole is closer to the second side-edge surface than to the first side-edge surface.

In some aspects, the techniques described herein relate to a slider, wherein the first medium-facing surface further includes a fifth hole situated between the first hole and the second hole.

In some aspects, the techniques described herein relate to a slider, wherein the fifth hole is equidistant from the first hole and the second hole.

In some aspects, the techniques described herein relate to a slider, wherein the first medium-facing surface further includes a sixth hole situated between the fifth hole and a leading-edge surface of the slider.

In some aspects, the techniques described herein relate to a slider, wherein a perimeter of the sixth hole is smaller than a perimeter of the fifth hole.

In some aspects, the techniques described herein relate to a slider, wherein: the second medium-facing surface further includes a sixth hole, and the third medium-facing surface further includes a seventh hole.

In some aspects, the techniques described herein relate to a slider, wherein the first medium-facing surface further includes sixth hole and a seventh hole.

In some aspects, the techniques described herein relate to a slider, wherein a shape of at least one of the first hole, the second hole, the third hole, or the fourth hole is cylindrical.

In some aspects, the techniques described herein relate to a slider, wherein the first hole and the second hole are included in a pattern of at least 20 holes.

In some aspects, the techniques described herein relate to a data storage device, including: one of the sliders recited above; and a recording medium, wherein the slider is situated in the data storage device with the first medium-facing surface, the second medium-facing surface, the third medium-facing surface, and the fourth medium-facing surface facing the recording medium.

In some aspects, the techniques described herein relate to a data storage device, further including helium between the slider and the recording medium, and wherein the data storage device is sealed to prevent the helium from escaping from an interior of the data storage device.

In some aspects, the techniques described herein relate to a slider including: a leading pad with a first media-facing surface, a first side pad with a second media-facing surface, a second side pad with a third media-facing surface, and a trailing pad with a fourth media-facing surface, wherein: the first media-facing surface, the second media-facing surface, the third media-facing surface, and the fourth media-facing surface are at a same level, the slider includes at least six holes distributed among the first media-facing surface, the second media-facing surface, the third media-facing surface, and the fourth media-facing surface, and each of the first media-facing surface, the second media-facing surface, the third media-facing surface, and the fourth media-facing surface includes at least one of the at least six holes.

In some aspects, the techniques described herein relate to a slider, wherein a first volume of a first hole of the at least six holes differs from a second volume of a second hole of the at least six holes.

In some aspects, the techniques described herein relate to a slider, wherein the first hole is situated in the first media-facing surface, and the second hole is situated in the second media-facing surface, the third media-facing surface, or the fourth media-facing surface, and wherein the first volume is larger than the second volume.

In some aspects, the techniques described herein relate to a slider, wherein the first hole is situated in the first media-facing surface, and the second hole is situated in the first media-facing surface.

In some aspects, the techniques described herein relate to a slider, wherein a third volume of a third hole of the at least six holes and the first volume are substantially identical.

In some aspects, the techniques described herein relate to a slider, wherein the third hole is situated in the first media-facing surface.

In some aspects, the techniques described herein relate to a slider, wherein: a first hole and a second hole of the at least six holes are situated in the first media-facing surface, and a third hole and a fourth hole of the at least six holes are situated in the fourth media-facing surface.

In some aspects, the techniques described herein relate to a slider, wherein: a fifth hole of the at least six holes is situated in the second media-facing surface, and a sixth hole of the at least six holes is situated in the third media-facing surface.

In some aspects, the techniques described herein relate to a slider, wherein at least two of the at least six holes have similar shapes in a Euclidean geometry sense.

In some aspects, the techniques described herein relate to a method of making one of the sliders described above, including: applying a mask to the slider, wherein the mask defines positions of the at least six holes; and while the mask is in place, performing ion milling to create the at least six holes.

In some aspects, the techniques described herein relate to a data storage device, including: the slider recited above; and a recording medium, wherein the at least six holes face the recording medium.

In some aspects, the techniques described herein relate to a slider, including: a leading pad including a first medium-facing surface, a first side pad including a second medium-facing surface, a second side pad including a third medium-facing surface, and a trailing pad including a fourth medium-facing surface, wherein: the first medium-facing surface includes at least a first hole and a second hole, the second medium-facing surface includes at least a third hole, and the third medium-facing surface includes at least a fourth hole.

In some aspects, the techniques described herein relate to a slider, wherein: the second medium-facing surface further includes at least a fifth hole, and the third medium-facing surface further includes at least a sixth hole.

In some aspects, the techniques described herein relate to a slider, wherein the first medium-facing surface further includes at least a seventh hole and an eighth hole.

In some aspects, the techniques described herein relate to a slider, wherein the first hole has a first depth, the second hole has a second depth, the third hole has a third depth, and the fourth hole has a fourth depth, and wherein each of the first depth, second depth, third depth, and fourth depth is at least 50 nm.

In some aspects, the techniques described herein relate to a slider, wherein the fourth medium-facing surface includes at least a fifth hole and a sixth hole.

In some aspects, the techniques described herein relate to a slider, wherein a perimeter of a least one of the first hole or the second hole is larger than a perimeter of at least one of the fifth hole or the sixth hole.

In some aspects, the techniques described herein relate to a slider device, wherein: the first hole is closer to a first side-edge surface than to a second side-edge surface, and the second hole is closer to the second side-edge surface than to the first side-edge surface.

In some aspects, the techniques described herein relate to a slider, wherein the first medium-facing surface further includes a fifth hole situated between the first hole and the second hole.

In some aspects, the techniques described herein relate to a slider, wherein the fifth hole is equidistant from the first hole and the second hole.

In some aspects, the techniques described herein relate to a slider, wherein the first medium-facing surface further includes a sixth hole situated between the fifth hole and a leading-edge surface of the slider.

In some aspects, the techniques described herein relate to a slider, wherein a perimeter of the sixth hole is smaller than a perimeter of the fifth hole.

In some aspects, the techniques described herein relate to a slider, wherein: the second medium-facing surface further includes a sixth hole, and the third medium-facing surface further includes a seventh hole.

In some aspects, the techniques described herein relate to a slider, wherein the first medium-facing surface further includes sixth hole and a seventh hole.

In some aspects, the techniques described herein relate to a slider, wherein a shape of at least one of the first hole, the second hole, the third hole, or the fourth hole is cylindrical.

In some aspects, the techniques described herein relate to a data storage device, including: one of the sliders recited above; and a recording medium, wherein the slider is situated in the data storage device with the first medium-facing surface, the second medium-facing surface, the third medium-facing surface, and the fourth medium-facing surface facing the recording medium.

In some aspects, the techniques described herein relate to a data storage device, further including helium between the slider and the recording medium, and wherein the data storage device is sealed to prevent the helium from escaping from an interior of the data storage device.

In some aspects, the techniques described herein relate to a slider including: a leading pad with a first media-facing surface, a first side pad with a second media-facing surface, a second side pad with a third media-facing surface, and a trailing pad with a fourth media-facing surface, wherein: the first media-facing surface, the second media-facing surface, the third media-facing surface, and the fourth media-facing surface are at a same level, the slider includes at least six holes distributed among the first media-facing surface, the second media-facing surface, the third media-facing surface, and the fourth media-facing surface, and each of the first media-facing surface, the second media-facing surface, the third media-facing surface, and the fourth media-facing surface includes at least one of the at least six holes.

In some aspects, the techniques described herein relate to a slider, wherein a first volume of a first hole of the at least six holes differs from a second volume of a second hole of the at least six holes.

In some aspects, the techniques described herein relate to a slider, wherein the first hole is situated in the first media-facing surface, and the second hole is situated in the second media-facing surface, the third media-facing surface, or the fourth media-facing surface, and wherein the first volume is larger than the second volume.

In some aspects, the techniques described herein relate to a slider, wherein the first hole is situated in the first media-facing surface, and the second hole is situated in the first media-facing surface.

In some aspects, the techniques described herein relate to a slider, wherein a third volume of a third hole of the at least six holes and the first volume are substantially identical.

In some aspects, the techniques described herein relate to a slider, wherein the third hole is situated in the first media-facing surface.

In some aspects, the techniques described herein relate to a slider, wherein: a first hole and a second hole of the at least six holes are situated in the first media-facing surface, and a third hole and a fourth hole of the at least six holes are situated in the fourth media-facing surface.

In some aspects, the techniques described herein relate to a slider, wherein: a fifth hole of the at least six holes is situated in the second media-facing surface, and a sixth hole of the at least six holes is situated in the third media-facing surface.

In some aspects, the techniques described herein relate to a slider, wherein at least two of the at least six holes have similar shapes in a Euclidean geometry sense.

In some aspects, the techniques described herein relate to a method of making one of the sliders described above, including: applying a mask to the slider, wherein the mask defines positions of the at least six holes; and while the mask is in place, performing ion milling to create the at least six holes.

In some aspects, the techniques described herein relate to a data storage device, including: one of the sliders recited above; and a recording medium, wherein the at least six holes face the recording medium.

BRIEF DESCRIPTION OF THE DRAWINGS

Objects, features, and advantages of the disclosure will be readily apparent from the following description of certain embodiments taken in conjunction with the accompanying drawings in which.

Figure 1:
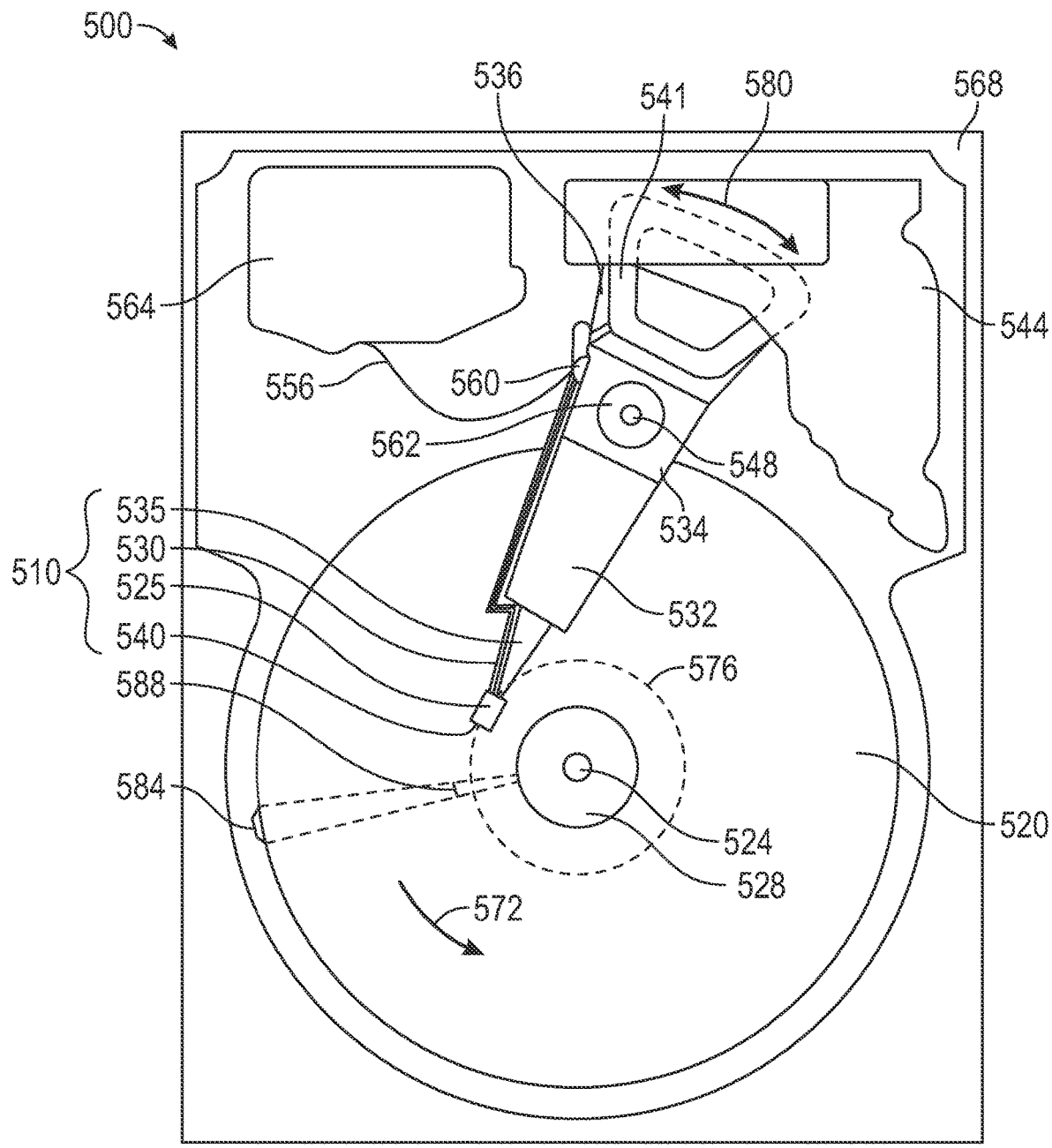
FIG. 1 is a plan view illustrating an example of a data storage device that may include one or more of the embodiments disclosed herein.

To facilitate understanding, identical reference numerals have been used, where possible, to designate identical elements that are common to the figures. It is contemplated that elements disclosed in one embodiment may be beneficially utilized in other embodiments without specific recitation. Moreover, the description of an element in the context of one drawing is applicable to other drawings illustrating that element.

DETAILED DESCRIPTION

Many data storage devices, such as hard disk drives, are operated in a standard air atmosphere (e.g., nitrogen, oxygen, and water vapor mixture). One way to reduce the power consumption of such devices is to reduce the speed at which the media (e.g., disks) spin. One consequence of reducing the spin speed of the media is a reduction in the air-bearing force on the slider.

As an alternative, or in addition, to reducing the speed at which the media spin, data storage devices such as hard disk drives can be filled with a lower-density gas, such as helium, and sealed to control and maintain the device's internal environment. Sealing mitigates or prevents leakage of internal gases from within the storage device. The use of helium, which has a density that is approximately one-seventh that of air, reduces friction and vibration in the device, thereby creating less drag and turbulence. Consequently, by running the hard disk drive in a less-dense atmosphere, such as an atmosphere of helium or a helium mixture, friction on the disk is reduced, thereby causing the disk to require less power in order to spin at a similar rate as the disks in drives that operate in standard air conditions. The use of helium also reduces the operating temperature of the drive, as well as noise generated by the drive. Further reduction in power consumption for sealed hard disk drives can be achieved by lower spin speed of the media and lower ambient pressure. Lower disk spin speed leads to undesirable slower data rates. Therefore, reduced ambient pressure is preferable to reduce slider/disk friction and hard disk drive power consumption.

The lower ambient pressure in sealed helium drives poses challenges to ABS designs, however. When operating in a lower-pressure environment, such as in helium or a helium mixture, a slider with a conventional ABS shape (e.g., designed to operate at higher ambient pressure) can become less stable. (It is to be understood that the legacy terms "air-bearing surface" and "ABS" are used herein to refer to the media-facing surface of the slider regardless of whether the data storage device operates in air or in a lower-pressure atmosphere (e.g., in helium or another lighter-than-air gas).) Thus, there is an ongoing need for slider designs that improve the performance of magnetic storage systems in lower-pressure atmospheres. These conditions are collectively referred to herein as lower-pressure conditions.

Disclosed herein are data storage devices and sliders that provide improved performance in lower ambient pressure conditions, and methods of making such sliders. In some embodiments, deep holes or cavities are placed on the surfaces of the slider that fly closest to the media of a data storage device. The holes are provided to store gas molecules (e.g., air, helium, etc.) as the slider flies over a medium. The storage of gas in the holes substantially offsets gas rarefication in lower ambient pressure conditions. As the slider flies over the disk, the deep holes in the ABS store gas molecules. The stored molecules help to stabilize the slider and prevent the slider from crashing into the disk (squeeze-film-like effect similar to a parachute). In addition, they provide higher air bearing damping, and they can also trap particles.

As explained further below, the holes can be situated near the edges of the slider to improve the stability of the slider. For example, the holes may be situated where they provide a cushioning or parachute-like effect near locations where the slider might otherwise come into contact due to decreasing stability in flight (e.g., sides, corners). The deep holes may be created using conventional fabrication processes (e.g., by etching using ion milling).

FIG. 1 is a plan view illustrating an example of a data storage device 500, illustrated as a hard disk drive, that may include one or more of the embodiments disclosed herein. FIG. 1 illustrates an example of the functional arrangement of components of the data storage device 500, including a slider 525 that includes a recording head 540. The recording head 540 (which may also be referred to herein as a transducer or a read/write transducer) includes a write element and a read element for respectively writing and reading information stored on a recording medium 520 of the data storage device 500. The data storage device 500 includes at least one head gimbal assembly (HGA) 510, which includes the slider 525, a suspension and actuator arm 530 attached to the slider 525, and a load beam 535 attached to the suspension and actuator arm 530. The data storage device 500 also includes at least one recording medium 520, which may be, for example, a recording medium, rotatably mounted on a spindle 524 and a drive motor (not shown) attached to the spindle 524 for rotating the recording medium 520. The recording medium 520, which may include a plurality of disks, may be affixed to the spindle 524 with a disk clamp 528.

The data storage device 500 further includes an arm 532 attached to the HGA 510, a carriage 534, a voice-coil motor (VCM) that includes an armature 536 including a voice coil 541 attached to the carriage 534, and a stator 544 including a voice-coil magnet. The armature 536 of the VCM is attached to the carriage 534 and is configured to move the arm 532 and the HGA 510 to access portions of the recording medium 520. The carriage 534 is mounted on a pivot-shaft 548 with an interposed pivot-bearing assembly 562. In the case of a HDD having multiple disks (also sometimes referred to as "platters"), the carriage 534 may be called an "E-block," or comb, because the carriage 534 is arranged to carry a ganged array of arms (multiple instances of the arm 532) that gives it the appearance of a comb.

An assembly comprising a head gimbal assembly (e.g., HGA 510), including a suspension flexure to which the slider 525 is coupled, an actuator arm (e.g., the arm 532) to which the suspension is coupled, and an actuator (e.g., the VCM) to which the actuator arm is coupled, may be collectively referred to as a head stack assembly (HSA). The HSA also includes a suspension tail. Generally, a HSA is the assembly configured to move the slider 525 to enable the recording head 540 to access portions of the recording medium 520 (e.g., magnetic-recording disks) for read and write operations.

In accordance with some embodiments, electrical signals (for example, current to the voice coil 541 of the VCM, write signals to and read signals from the recording head 540, etc.) are provided by a flexible interconnect cable 556 (which may be referred to as a "flex cable"). Interconnection between the flex cable 556 and the recording head 540 may be provided by an arm-electronics (AE) module 560, which may have an on-board pre-amplifier for the read signal, as well as other read-channel and write-channel electronic components. The AE module 560 may be attached to the carriage 534 as shown. The flex cable 556 is coupled to an electrical-connector block 564, which provides electrical communication through electrical feed-throughs provided by a data storage device housing 568. The data storage device housing 568, in conjunction with a cover (not shown), provides a sealed, protective enclosure for the information storage components of the data storage device 500.

In accordance with some embodiments, other electronic components, including a disk controller and servo electronics such as a digital-signal processor (DSP), provide electrical signals to the drive motor, the voice coil 541 of the VCM, and the recording head 540 of the HGA 510. The electrical signal provided to the drive motor enables the drive motor to spin, thereby providing a torque to the spindle 524, which is in turn transmitted to the recording medium 520 that is affixed to the spindle 524 by the disk clamp 528; as a result, the recording medium 520 spins in a direction 572. Because it is spinning, the recording medium 520 creates a cushion of air that acts as an air-bearing on which the air-bearing surface (ABS) of the slider 525 rides so that the slider 525 flies above the surface of the recording medium 520 without making contact with a thin magnetic-recording layer of the recording medium 520 in which information is recorded.

The electrical signal provided to the voice coil 541 of the VCM enables the recording head 540 of the HGA 510 to access a track 576 on which information is recorded. Thus, the armature 536 of the VCM swings through an arc 580, which enables the HGA 510 attached to the armature 536 by the arm 532 to access various tracks on the recording medium 520. Information is stored on the recording medium 520 in a plurality of sectored tracks arranged in sectors on the recording medium 520, for example, sector 584. Correspondingly, each track is composed of a plurality of sectored track portions, for example, the sectored track portion 588. Each sectored track portion 588 includes recorded data and a header containing a servo-burst-signal pattern, for example, an ABCD-servo-burst-signal pattern, information that identifies the track 576, and error correction code information. In accessing the track 576, the read element of the recording head 540 of the HGA 510 reads the servo-burst-signal pattern, which provides a position-error-signal (PES) to the servo electronics, which controls the electrical signal provided to the voice coil 541 of the VCM, enabling the recording head 540 to follow the track 576. Upon finding the track 576 and identifying a particular sectored track portion 588, the recording head 540 either reads data from the track 576 or writes data to the track 576, depending on instructions received by the disk controller from an external agent, for example, a microprocessor of a computer system to which the data storage device 500 is connected.

For reading the information stored on the recording medium 520, the recording head 540 may include only one read sensor, or it may include multiple read sensors. The read sensor(s) in the recording head 540 may include, for example, one or more giant magnetoresistance (GMR) sensors, tunneling magnetoresistance (TMR) sensors, or another type of magnetoresistive sensor. When the slider 525 passes over a track 576 on the recording medium 520, the recording head 540 detects changes in resistance due to magnetic field variations recorded on the recording medium 520, which represent the recorded bits.

The data storage device 500 may be what is at times referred to as a "hybrid drive." A hybrid drive refers generally to a storage device having functionality of both a traditional hard disk drive (HDD) combined with a solid-state storage device (SSD) using non-volatile memory, such as flash or other solid-state (e.g., integrated circuits) memory, which is electrically erasable and programmable. Because operation, management, and control of the different types of storage media typically differ, the solid-state portion of a hybrid drive may include its own corresponding controller functionality, which may be integrated into a single controller along with the HDD functionality. A hybrid drive may be architected and configured to operate and to utilize the solid-state portion in a number of ways, such as, for non-limiting examples, by using the solid-state memory as cache memory, for storing frequently-accessed data, for storing I/O intensive data, and the like. Furthermore, a hybrid drive may be architected and configured essentially as two storage devices in a single enclosure, e.g., a traditional HDD and a SSD, with either one or multiple interfaces for host connection.

To obtain good performance, it is desirable for the slider 525 to maintain a substantially constant flying height above the surface of the recording medium 520. The degree of stability of the fly-height of the slider 525 influences the performance of the recording head 540. The design of the slider 525 ABS has an impact on the flying characteristics of the slider 525 and therefore the performance of the recording head 540.

Figure 2:
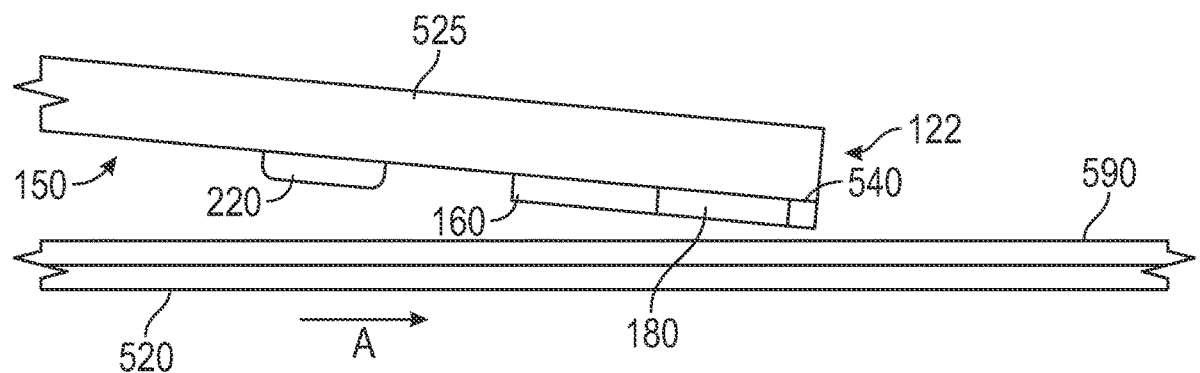
FIG. 2 is a side view of the slider and the recording medium of FIG. 1.

FIG. 2 is a side view of the slider 525 and the recording medium 520 of FIG. 1. The slider 525 may be in accordance with one or more of the embodiments disclosed herein. The recording medium 520 is moving in the direction of arrow A and causes airflow in the same direction. This airflow flows over the ABS 150 of the slider 525 and produces the lifting pressure described above. In some embodiments, the slider 525 includes raised areas such as a leading pad 220, one or more side pads 160, and a trailing pad 180. The trailing pad 180, located adjacent to the trailing-edge surface 122 of the slider 525, may further include the recording head 540 that writes data to and reads data from the recording medium 520. The recording medium 520 has a lubricant 590 on its upper surface to protect the recording layer of the recording medium 520 from contact with the slider 525 and/or other components of the data storage device 500.

Figure 3A:
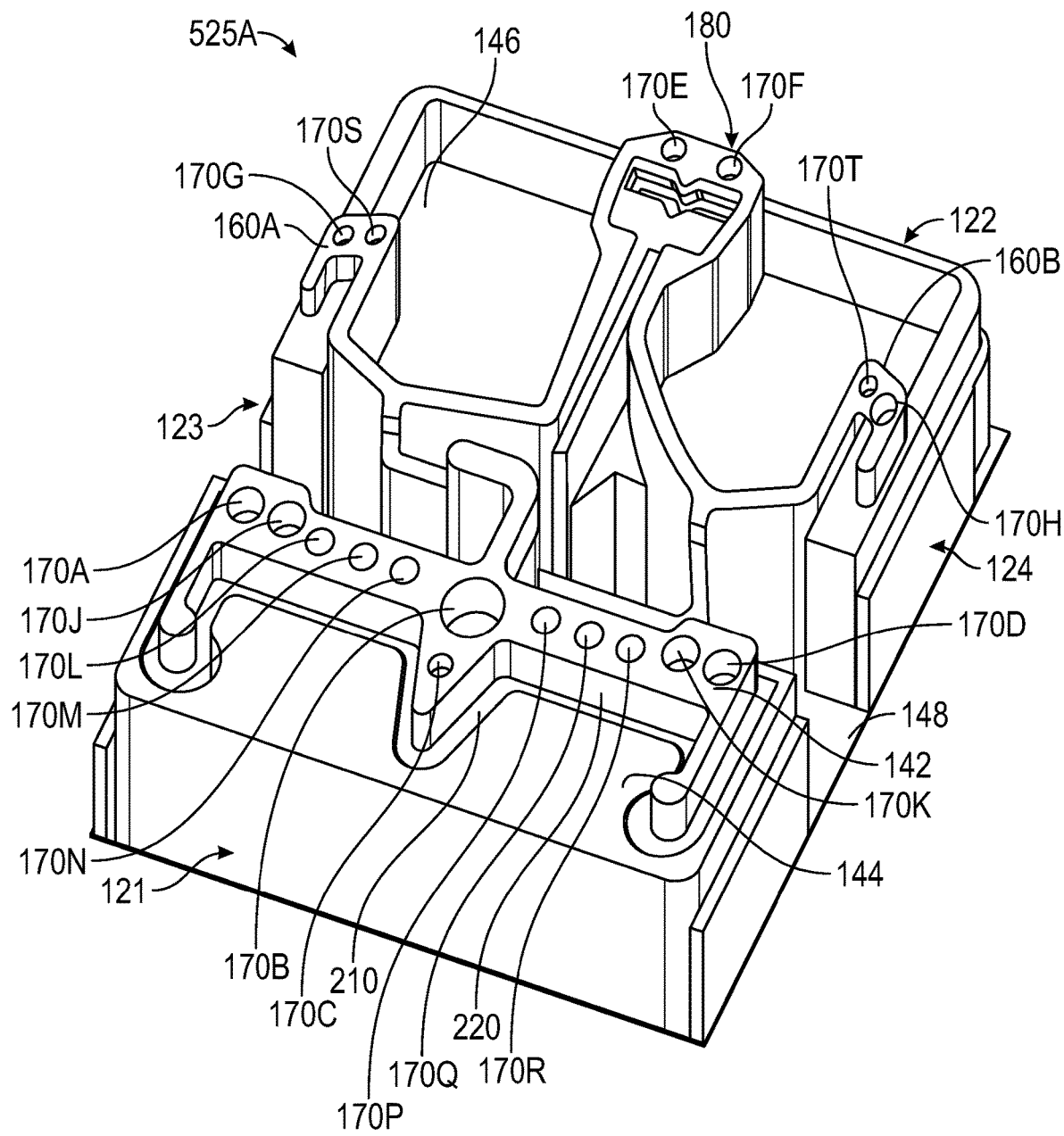
FIG. 3A is an isometric view of an example slider with deep holes in accordance with some embodiments.
Figure 3B:
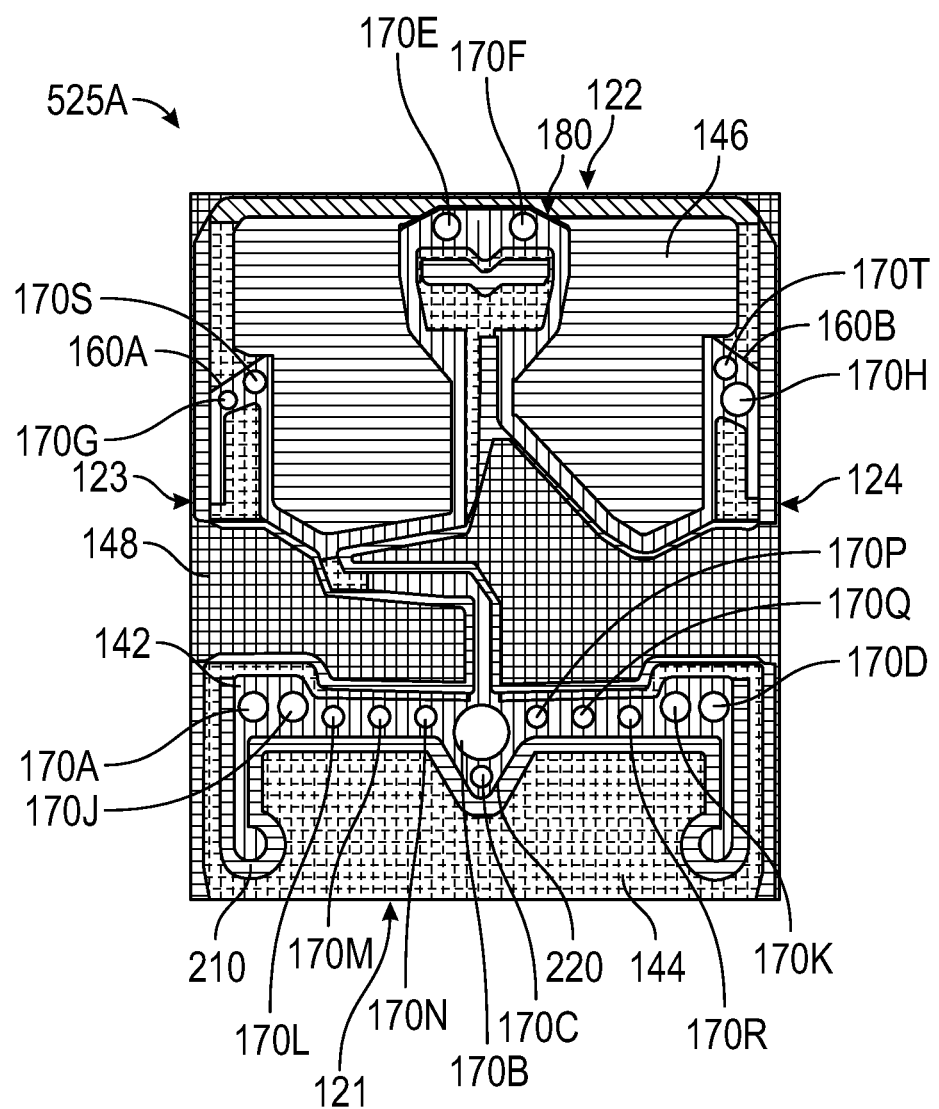
FIG. 3B is an ABS view of the example slider shown in FIG. 3A in accordance with some embodiments.

FIG. 3A is an isometric view of an example of a slider 525A with deep holes in certain ABS 150 surfaces in accordance with some embodiments. FIG. 3B is an ABS view of the slider 525A of FIG. 3A. As shown in FIG. 3A and FIG. 3B, the slider 525A has a leading-edge surface 121, a trailing-edge surface 122 opposite the leading-edge surface 121, a first side-edge surface 123 extending between the leading-edge surface 121 and the trailing-edge surface 122, and a second side-edge surface 124 opposite the first side-edge surface 123 and extending between the leading-edge surface 121 and the trailing-edge surface 122.

The slider 525A includes a leading pad 220 near the leading-edge surface 121 and a trailing pad 180 near the trailing-edge surface 122 of the slider 525A. Typically, the trailing pad 180 has a recording head 540 mounted thereon, on the rear portion of the trailing pad 180 close to the trailing-edge surface 122 of the slider 525A. The slider 525A also has a first side-edge pad 160A situated close to the first side-edge surface 123 and a second side-edge pad 160B situated close to the second side-edge surface 124.

The ABS 150 of the slider 525A includes surfaces at different levels. With the slider 525A oriented as shown in FIG. 3A (with the ABS 150 facing upward), the upper-most surfaces of the various features are at the level 142. The level 142 is the level that, when the ABS 150 is facing upward, is the highest level of the ABS 150. When the slider 525A is installed in a data storage device 500, the level 142 is the level of the ABS 150 that is closest to the recording medium 520. The medium-facing surface of the leading pad 220, the medium-facing surface of the first side-edge pad 160A, the medium-facing surface of the second side-edge pad 160B, and the medium-facing surface of the trailing pad 180 are all at the level 142.

The ABS 150 of the slider 525A shown in FIGS. 3A and 3B also includes a plurality of deep holes in the medium-facing surfaces of the leading pad 220, the first side-edge pad 160A, the second side-edge pad 160B, and the trailing pad 180 (at the level 142). The deep holes are referred to herein generally as the holes 170. Individual holes 170 are referred to using the reference numeral 170 followed by a letter. In some embodiments, the slider 525A includes at least six holes 170. In some embodiments, the leading pad 220 includes at least two holes 170, the first side-edge pad 160A includes at least one hole 170, the second side-edge pad 160B includes at least one hole 170, and the trailing pad 180 includes at least two holes 170.

In the example embodiment of FIGS. 3A and 3B, the slider 525A has a total of eighteen holes 170, but the number of holes 170 can be more or fewer than eighteen.

The leading pad 220 has a total of twelve holes 170 in the example embodiment shown in FIGS. 3A and 3B. The holes 170 in the medium-facing surface of the leading pad 220 include the hole 170A, hole 170J, hole 170L, hole 170M, hole 170N, hole 170B, hole 170C, hole 170P, hole 170Q, hole 170R, hole 170K, and hole 170D. Several of the holes 170 are closer to the first side-edge surface 123 than they are to the second side-edge surface 124, and other of the holes 170 are closer to the second side-edge surface 124 than they are to the first side-edge surface 123. For example, the holes 170A, 170J, 170K, 170M, and 170N are all closer to the first side-edge surface 123 than they are to the second side-edge surface 124. Similarly, the holes 170D, 170K, 170R, 170Q, and 170P are all closer to the second side-edge surface 124 than they are to the first side-edge surface 123. The hole 170J, hole 170L, hole 170M, hole 170N, hole 170B, hole 170C, hole 170P, hole 170Q, hole 170R, and hole 170K are situated between the hole 170A and the hole 170D. The hole 170B and the hole 170C are both equidistant between various pairs of holes 170, such as, for example, the hole 170A and the hole 170D, the hole 170J and the hole 170K, etc. The hole 170C is situated between the hole 170B and the leading-edge surface 121. The leading pad 220 can include more or fewer than twelve holes 170.

In the example shown in FIGS. 3A and 3B, the first side-edge pad 160A includes the hole 170G and the hole 170S. The second side-edge pad 160B includes the hole 170H and the hole 170T. The first side-edge pad 160A and the second side-edge pad 160B may have more or fewer than two holes 170 each.

The trailing pad 180 includes the hole 170E and the hole 170F. The recording head 540 may be situated between the hole 170E and the hole 170F. The trailing pad 180 may have more or fewer holes 170 than two.

It is to be understood that the slider 525A can have more or fewer holes 170 than shown in FIGS. 3A and 3B, and they may be distributed differently than shown in FIGS. 3A and 3B.

The holes 170 can have any suitable sizes, shapes, and volumes. Their shapes can be regular or irregular. For example, as illustrated in FIGS. 3A and 3B, the holes 170 can have a circular shape in the medium-facing surfaces. Other shapes (e.g., rectangular, triangular, hexagonal, etc.) are possible.

The volumes (interiors) of the holes 170 can also regular or irregular, and they can have any suitable shapes (e.g., cylindrical, cuboid, etc.). The interiors can be smooth or rough.

Different holes 170 can have the same size, shape, and/or volume, or they can be different. The shapes and/or volumes of different holes 170 can be similar in the Euclidean geometry sense (meaning that they have the same shape, or one can be obtained from the other by scaling, translation, rotation, and/or reflection). For example, in the example embodiment shown in FIGS. 3A and 3B, all of the holes 170 are similar to each other in the Euclidean geometry sense. The volumes of different holes 170 can be substantially identical, or they can be different. In some embodiments, at least two holes 170 have different volumes. For example, in the example illustrated in FIGS. 3A and 3B, assuming that their depths are the same, the hole 170A and the hole 170B have different volumes.

Some of the holes 170 have different perimeters at the level 142. For example the hole 170B has a larger perimeter than any of the other holes 170 illustrated in the slider 525A of FIGS. 3A and 3B. For example, the perimeter of the hole 170B is larger than the perimeter of the hole 170C. As another example, the perimeter of the hole 170D is larger than the perimeter of any of the hole 170G, hole 170S, or hole 170T. (It is to be understood that the perimeter of a hole 170 that has a circular shape is its circumference.)

The holes 170 can have any suitable size and shape in two dimensions (e.g., in the ABS view of FIG. 3B) or three dimensions. For example, in the ABS view, the holes 170 may have recognizable shapes (e.g., circular, square, triangular, etc.), or they may have irregular, random shapes. Different holes 170 can have the substantially identical shapes, or different holes 170 can have different shapes in two and/or three dimensions. Regardless of whether their shapes are the same, different holes 170 can have the same diameter, circumference, perimeter, or volume, or they can have different diameters, circumferences, perimeters, and/or volumes. As will be appreciated by those having ordinary skill in the art in light of the disclosures herein, the sizes, shapes, locations, and number of the holes 170 can be selected to achieve a desired stability and flight characteristics for the slider 525A (e.g., lift, damping, etc.).

FIGS. 3A and 3B illustrate holes 170 that have cylindrical shapes and volumes. The perimeters of the holes 170 at the level 142 are circular and, thus, are circumferences. As shown in FIGS. 3A and 3B, the circumferences of the holes 170 in the level 142 can be the same or different. For example, the hole 170B has a larger circumference than the hole 170A or the hole 170C.

The depths of the holes 170 can be any suitable depth(s) that provide the desired squeeze-film-like effect as well as other flight characteristics (e.g., lift, stability, etc.). For example, the depth of some or all of the holes 170 may be approximately 100 nm or more. Different holes 170 can have the same depth or different depths.

The ABS 150 also includes surfaces at a level 144, which, in the orientation of FIG. 3A, is below the level 142. The level 144 may be, for example, approximately 100 nm to 200 nm below the level 142. When the slider 525A is installed in a data storage device 500, the level 144 is further from the recording medium 520 than the level 142 is from the recording medium 520.

The ABS 150 also includes surfaces at a level 146, which, in the orientation of FIG. 3A, is below the level 142 and the level 144. The level 146 may be, for example, approximately 500 to 3000 nm below the level 142. When the slider 525A is installed in a data storage device 500, the level 146 is further from the recording medium 520 than are the level 142 and the level 144.

The ABS 150 also includes surfaces at a level 148, which, in the orientation of FIG. 3A, is below the level 142, the level 144, and the level 146. The level 148 may be, for example, approximately 1000 to 5000 nm (1-5 microns) below the level 142. When the slider 525A is installed in a data storage device 500, the level 148 is further from the recording medium 520 than are the level 142, the level 144, and the level 146.

The holes 170 in the slider 525A can capture particles as the slider 525A flies over the recording medium 520. To further improve particle-trapping capabilities, the example slider 525A shown in FIG. 3A and FIG. 3B also includes a particle-trapping structure 210 that abuts the base of the leading pad 220. The particle-trapping structure 210 shown in FIGS. 3A and 3B is a continuous cavity that extends below the level 144 and is configured to collect particles that might otherwise damage the recording medium 520 or adversely affect the performance of a data storage device 500. The particle-trapping structure 210 can significantly improve particle robustness by capturing particles as the slider 525A flies over the recording medium 520. The particle-trapping structure 210 may have a depth of at least 50 nm below the level 144.

Figure 4A:
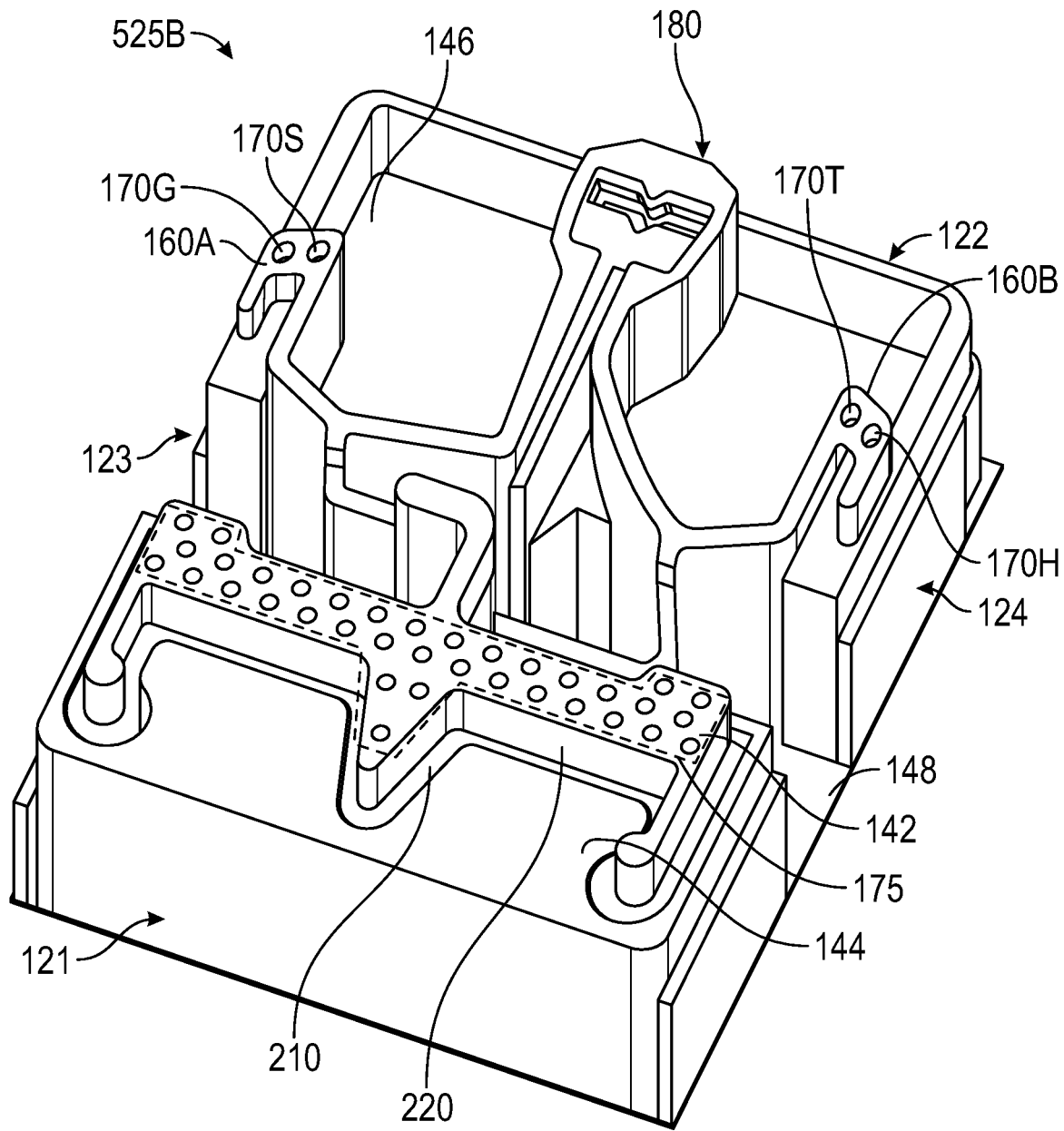
FIG. 4A is an isometric view of another example slider with deep holes in accordance with some embodiments.
Figure 4B:
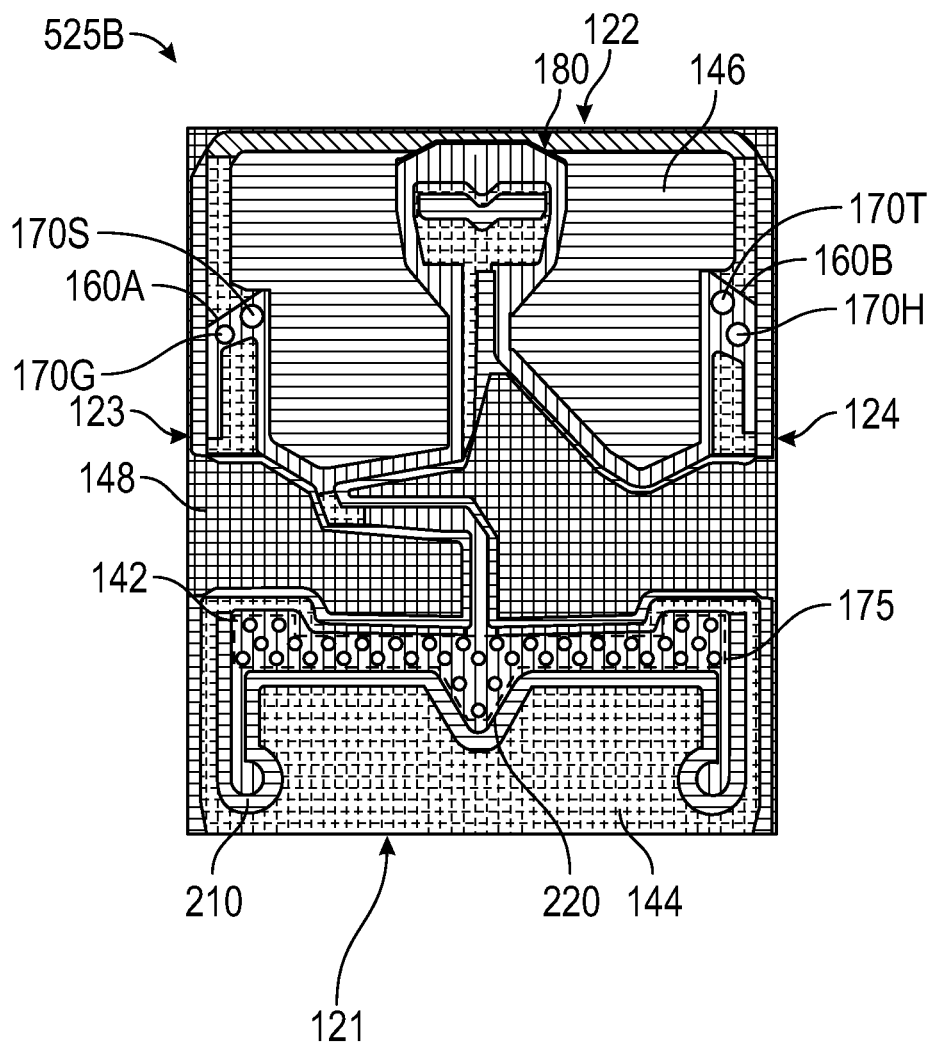
FIG. 4B is an ABS view of the example slider shown in FIG. 4A in accordance with some embodiments.

FIG. 4A is an isometric view of another example of a slider 525B with deep holes in certain ABS 150 surfaces in accordance with some embodiments. FIG. 4B is an ABS view of the slider 525B of FIG. 4A. As compared to the slider 525A in FIGS. 3A and 3B, the slider 525B of FIGS. 4A and 4B does not include any holes 170 in the trailing pad 180, the hole 170H is smaller than in FIGS. 3A and 3B, and the leading pad 220 of FIGS. 4A and 4B includes a pattern of holes 175 that is different from the holes 170 shown in FIGS. 3A and 3B.

As shown in FIG. 4A and FIG. 4B, like the slider 525A illustrated in FIGS. 3A and 3B, the slider 525B has a leading-edge surface 121, a trailing-edge surface 122 opposite the leading-edge surface 121, a first side-edge surface 123 extending between the leading-edge surface 121 and the trailing-edge surface 122, and a second side-edge surface 124 opposite the first side-edge surface 123 and extending between the leading-edge surface 121 and the trailing-edge surface 122. The slider 525B shown in FIGS. 4A and 4B also includes a leading pad 220 near the leading-edge surface 121 and a trailing pad 180 near the trailing-edge surface 122 of the slider 525B. Typically, the trailing pad 180 has a recording head 540 mounted thereon, on the rear portion of the trailing pad 180 close to the trailing-edge surface 122 of the slider 525B. The slider 525B also has a first side-edge pad 160A situated close to the first side-edge surface 123 and a second side-edge pad 160B situated close to the second side-edge surface 124.

The ABS 150 of the slider 525B includes surfaces at different levels, namely level 142, level 144, level 146, and level 148. The level 142, level 144, level 146, and level 148 were described above in the discussion of FIGS. 3A and 3B. Those descriptions apply here and are not repeated.

The example slider 525B shown in FIG. 4A and FIG. 4B includes a particle-trapping structure 210 that abuts the base of the leading pad 220. The particle-trapping structure 210 was described above in the discussion of FIGS. 3A and 3B. That description applies here and is not repeated.

With the slider 525B oriented as shown in FIG. 4A (with the ABS 150 facing upward), the upper-most surfaces of the various features are at the level 142. The level 142 is the level that, when the ABS 150 is facing upward, is the highest level of the ABS 150. When the slider 525B is installed in a data storage device 500, the level 142 is the level of the ABS 150 that is closest to the recording medium 520. The medium-facing surface of the leading pad 220, the medium-facing surface of the first side-edge pad 160A, the medium-facing surface of the second side-edge pad 160B, and the medium-facing surface of the trailing pad 180 are all at the level 142.

The ABS 150 of the slider 525B shown in FIGS. 4A and 4B also includes a plurality of deep holes in the medium-facing surfaces of the leading pad 220, the first side-edge pad 160A, and the second side-edge pad 160B. Optionally, the ABS 150 can also have one or more deep holes in the trailing pad 180 (at the level 142). For example, the trailing pad 180 can optionally include the hole 170E and the hole 170F shown in FIGS. 3A or 3B (e.g., with the recording head 540 situated between the hole 170E and the hole 170F). In embodiments in which the trailing pad 180 includes one or more holes 170, it may have more or fewer holes 170 than two. The holes 170 in the slider 525B can capture particles as the slider 525B flies over the recording medium 520.

In the slider 525B shown in FIGS. 4A and 4B, the first side-edge pad 160A includes the hole 170G and the hole 170S. The second side-edge pad 160B includes the hole 170H and the hole 170T. As compared to the example slider 525A of FIGS. 3A and 3B, the hole 170H is smaller in the example slider 525B shown in FIGS. 4A and 4B. As explained above, the sizes, shapes, and volumes of the holes 170 can be selected to provide the desired characteristics (e.g., lift, damping, etc.). The first side-edge pad 160A and the second side-edge pad 160B may have more or fewer than two holes 170 each. The descriptions above of the holes 170 in the first side-edge pad 160A and second side-edge pad 160B in the discussion of FIGS. 3A and 3B apply to FIGS. 4A and 4B and are not repeated here.

In the example slider 525B of FIGS. 4A and 4B, the leading pad 220 includes a pattern of holes 175. The pattern of holes 175 may include any number of holes 170 in any arrangement and/or density selected to provide desirable characteristics, such as, for example, damping. As just one example, if the diameters of the holes 170 in the pattern of holes 175 are around 20 microns, the nearest-neighbor distance between holes may be greater than or equal to around 40 microns. The pattern of holes 175 may be regular (e.g., as illustrated in FIGS. 4A and 4B), or it may be irregular. The pattern of holes 175 may give the leading pad 220 a dimpled appearance (e.g., similar to the surface of a golf ball).

In the example embodiment of FIGS. 4A and 4B, the pattern of holes 175 has a total of thirty-six holes 170, but the pattern of holes 175 can have more or fewer holes 170 than 36. Moreover, the holes 170 in the pattern of holes 175 can be distributed differently than shown in FIGS. 4A and 4B. For example, they may be closer together or further apart than shown in FIGS. 4A and 4B.

The individual holes 170 in the pattern of holes 175 can have any suitable sizes, shapes, and volumes. Their shapes can be regular or irregular. For example, as illustrated in FIGS. 4A and 4B, the holes 170 in the pattern of holes 175 can have a circular shape in the medium-facing surface of the leading pad 220. Other shapes (e.g., rectangular, triangular, hexagonal, etc.) are possible.

The volumes (interiors) of the holes 170 in the pattern of holes 175 can also regular or irregular, and they can have any suitable shapes (e.g., cylindrical, cuboid, etc.). The interiors can be smooth or rough.

The holes 170 in the pattern of holes 175 can have any suitable size and shape in two dimensions (e.g., in the ABS view of FIG. 4B) or three dimensions. Different holes 170 of the pattern of holes 175 can have the same size, shape, and/or volume, or they can be different. The sizes, shapes, and/or volumes of different holes 170 in the pattern of holes 175 can be substantially identical to each other. For example, in the example embodiment shown in FIGS. 4A and 4B, all of the holes 170 of the pattern of holes 175 are substantially identical in size, shape, and volume. The holes 170 in the pattern of holes 175 can be similar in the Euclidean geometry sense to other holes 170 in the slider 525B (e.g., the holes 170 in the first side-edge pad 160A and/or second side-edge pad 160B). Alternatively, the sizes and/or shapes and/or volumes of different holes 170 of the pattern of holes 175 can be different.

In the ABS view (e.g., as shown in FIG. 4B), the holes 170 in the pattern of holes 175 may have recognizable shapes (e.g., circular, square, triangular, etc.), or they may have irregular, random shapes. As will be appreciated by those having ordinary skill in the art in light of the disclosures herein, the sizes, shapes, locations, and number of the holes 170 in the pattern of holes 175 can be selected to achieve a desired stability and flight characteristics for the slider 525B (e.g., lift, damping, etc.).

The depths of the holes 170 in the pattern of holes 175 can be any suitable depth(s) that provide the desired squeeze-film-like effect as well as other flight characteristics (e.g., lift, stability, damping, etc.). For example, the depth of some or all of the holes 170 in the pattern of holes 175 may be approximately 100 nm or more. Different holes 170 in the pattern of holes 175 can have the same depth or different depths.

As explained above in the discussion of FIG. 1, in a data storage device 500, the slider 525 is attached to a suspension and actuator arm 530 and flies close to the recording medium 520. The suspension and actuator arm 530 is characterized by a frequency that can, undesirably, resonate with the pitch and/or roll frequencies of the slider 525. Because of the small distance between the slider 525 and the recording medium 520, in practical data storage device 500, the slider 525 will likely collide with (for example) asperities of the recording medium 520. These impacts can cause the slider 525 to vibrate. It is important for vibrations of the slider 525 to be damped out quickly. Otherwise, the slider 525 could be driven into resonance by successive impacts that cause the slider 525 to vibrate even more, which could cause the slider 525 to crash into the recording medium 520.

One benefit of the addition of holes 170 to the ABS 150 of a slider 525 as disclosed herein is that they result in a softer ABS 150 with improved damping relative to conventional sliders. The presence of holes 170 (e.g., as shown in FIGS. 3A, 3B, 4A, and/or 4B) reduces the efficiency of pressurization when the slider 525 flies, but it also creates discontinuities. As a result, gas molecules flowing past the holes 170 experience a shearing effect, which dissipates energy that might otherwise cause a higher amount of vibration (e.g., pitching and/or rolling). This dissipation of energy improves the damping.

The table below provides results of simulations of an example slider 525 that includes holes 170 as disclosed herein. The table indicates improvements in roll and pitch damping at the inner diameter (ID), the middle diameter (MD), and the outer diameter (OD). The improvements are provided as multiplicative factors relative to the damping of a conventional slider. In other words, if the roll damping of a conventional slider is x at the ID, the use of holes 170 as disclosed herein in the ABS 150 of a slider 525 can provide roll damping at the ID of 1.8x.

| Radius | ID | MD | OD |
| --- | --- | --- | --- |
| Roll damping (relative to x) | 1.8x | 1.3x | 1.01x |
| Pitch damping (relative to x) | 2.5x | 2.1x | 1.9x |

As the table shows, at each radius, the pitch and roll damping is uniformly higher for a slider 525 with holes 170 (e.g., as illustrated in the example embodiments of FIG. 3A, 3B, 4A, and/or 4B). On average, as a result of the use of the holes 170 as described herein, roll damping is improved by a factor of about 1.4, and pitch damping is improved by a factor of about 2.2.

The holes 170 illustrated in FIGS. 3A, 3B, 4A, and 4B can be created during fabrication of the slider 525 (e.g., the example slider 525A, the example slider 525B, or any other slider 525 that incorporates the disclosures herein). The slider 525 can be fabricated from a wafer using a photolithography process having two fundamental steps: (a) covering a portion of a surface of the wafer (e.g., using a photoresist mask), and (b) removing substrate material from the exposed (e.g., not covered by the mask) surface of the wafer. Step (a) may be accomplished, for example, using a binary mask having hard edges to create a well-defined pattern in a photoresist layer that is applied to the wafer surface. Step (b) may be accomplished, for example, by lapping, etching, or milling (e.g., using an ion beam) to transfer the photoresist pattern to the wafer surface. The surface of the slider 525 to which the covering is applied and from which material is removed is the surface that will eventually face the recording medium 520 when the slider 525 is used in a data storage device 500, i.e., the ABS 150.

The steps (a) and (b) may be repeated multiple times to create different features of the slider 525. The following discussion focuses on the steps that can create the holes 170, but it will be appreciated that the other features of the ABS 150 can also be fabricated during the described steps or during other steps of the slider 525 manufacturing process that are known in the art.

In some embodiments, a first application of the step (a) covers (e.g., using a mask) the portion of the slider 525 that will remain at the level 142 in the finished slider 525. In some embodiments, the mask does not protect the locations of the holes 170. While the mask is in place, the first application of step (b) may use shallow ion milling to remove material to create the surfaces at the level 144. In embodiments in which the mask does not cover the locations of the holes 170, the result of this application of steps (a) and (b) is that holes 170 are created having a depth at the level 144. That mask can then be removed. A different mask can then be applied, and the steps (a) and (b) repeated (e.g., via one or more deeper ion milling steps) to create features that are recessed further from the top-most surface of the ABS 150 (e.g., to create deeper holes 170).

Figure 5:
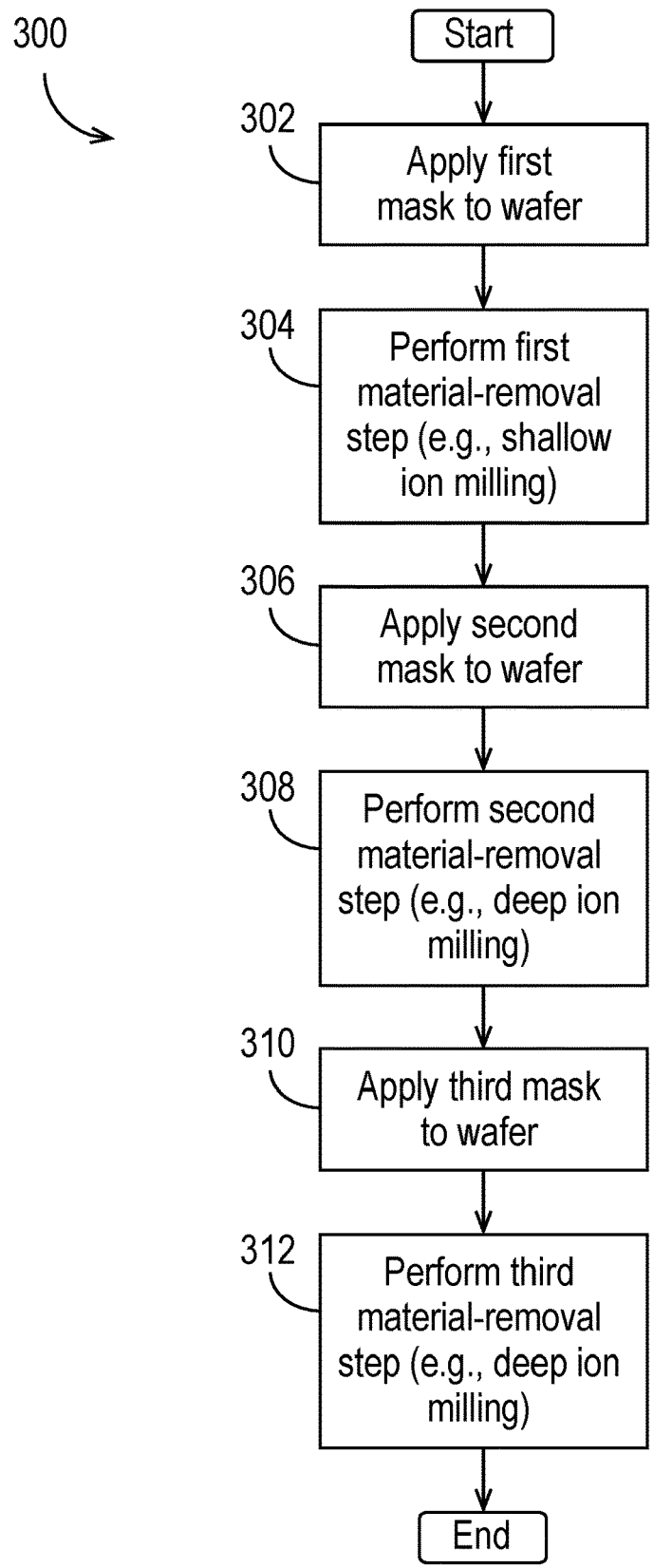
FIG. 5 is a flow diagram illustrating a portion of an example method that can be used to fabricate sliders with deep holes in accordance with some embodiments.

FIG. 5 is a flow diagram illustrating a portion of an example method 300 that can be used to fabricate embodiments of the sliders 525 with holes 170 as described herein. As explained above, the slider 525 fabrication process can include additional steps that are known in the art but that are not shown in FIG. 5. These additional steps may be performed before, between, and/or after the steps illustrated in FIG. 5. As explained above, although the description of the method 300 focuses only the steps of the method 300 related to creating the holes 170, it will be appreciated that other features of the slider 525 can also be created during these steps.

At block 302, a first mask is applied to the wafer. The first mask includes a region that defines the medium-facing surfaces of the leading pad 220, the first side-edge pad 160A, the second side-edge pad 160B, and the trailing pad 180. In some embodiments, the mask does not protect the wafer in the locations where the holes 170 will be. At block 304, a first material-removal step is performed to remove material from the wafer to create features at the level 144. The first material-removal step may use, for example, shallow ion milling. At least portions of the leading pad 220, the first side-edge pad 160A, the second side-edge pad 160B, the trailing pad 180, and the holes 170 may be apparent in the slider 525 after block 304 is complete.

After completion of block 304, and potentially additional intervening manufacturing steps, at block 306, a second mask is applied to the wafer. The second mask covers the level 142 and the level 144 except where additional features will be created and situated at the level 146. Optionally, the second mask exposes some or all of the holes 170 created at block 304 so that the depths of those holes 170 can be increased. At block 308, a second material-removal step is performed to remove additional material from the wafer, including additional material from any holes 170 left uncovered by the second mask. After block 308, the slider 525 includes features and surfaces at the level 146. It will be appreciated that after block 308, the depths of any holes 170 left uncovered by the second mask will be larger than the depths of any holes 170 covered by the second mask. Specifically, the depths of the holes 170 left uncovered during the material-removal step of block 308 will be at the level 146.

After completion of block 308, and potentially additional intervening manufacturing steps, at block 310, a third mask is applied to the wafer. The third mask covers the level 142, the level 144, and the level 146, except where additional features will be created and situated at the level 148. Optionally, the third mask exposes some or all of the holes 170 created at block 308 so that the depths of those holes 170 can be increased. At block 312, a third material-removal step is performed to remove additional material from the wafer, including additional material from any holes 170 left uncovered by the third mask. It will be appreciated that after block 312, the depths of any holes 170 left uncovered by the second mask will be larger than the depths of any holes 170 covered by the second mask. Specifically, the depths of the holes 170 left uncovered during the material-removal step of block 312 will be at the level 148.

It will be appreciated that the depths of individual holes 170 can be different following the method 300 described in the discussion of FIG. 5 by selectively covering individual holes 170 during the various steps of the method 300. It will also be appreciated that the holes 170 can be created during one or more of the steps described above (e.g., in the discussion of block 304, block 308, and block 312). Although the discussion above describes removing material from all of the holes 170 in block 304, it is possible to create some or all of the holes 170 entirely during other phases of the manufacturing process (e.g., block 308 and/or block 312). The examples herein are not intended to be limiting.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to."

The terms "exemplary" and "embodiment" are used to express examples, not preferences or requirements.

The term "coupled" is used herein to express a direct connection/attachment as well as a connection/attachment through one or more intervening elements or structures.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The term "substantially" is used to describe a structure, configuration, dimension, etc. that is largely or nearly as stated, but, due to manufacturing tolerances and the like, may in practice result in a situation in which the structure, configuration, dimension, etc. is not always or necessarily precisely as stated. For example, describing two lengths as "substantially equal" means that the two lengths are the same for all practical purposes, but they may not (and need not) be precisely equal at sufficiently small scales. As another example, two surfaces are "substantially perpendicular" when they are considered to be perpendicular to each other for all practical purposes, even if they are not precisely at 90 degrees relative to each other.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

The invention claimed is:

1. A slider, comprising:
a leading pad comprising a first medium-facing surface,
a first side pad comprising a second medium-facing surface,
a second side pad comprising a third medium-facing surface, and
a trailing pad comprising a fourth medium-facing surface, wherein:
the first medium-facing surface includes at least a first hole, a second hole, a third hole, and a fourth hole, wherein:
the first hole is closer to a first side-edge surface than to a second side-edge surface,
the second hole is closer to the second side-edge surface than to the first side-edge surface,
the third hole is situated between and equidistant from the first hole and the second hole, and
the fourth hole is situated between the third hole and a leading-edge surface of the slider,
the second medium-facing surface includes at least a fifth hole, and
the third medium-facing surface includes at least a sixth hole.

2. The slider recited in claim 1, wherein:
the second medium-facing surface further includes at least a seventh hole, and
the third medium-facing surface further includes at least an eighth hole.

3. The slider recited in claim 2, wherein the first medium-facing surface further includes at least a ninth hole and a tenth hole.

4. The slider recited in claim 1, wherein the first hole has a first depth, the second hole has a second depth, the third hole has a third depth, and the fourth hole has a fourth depth, and wherein each of the first depth, the second depth, the third depth, and the fourth depth is at least 50 nm.

5. The slider recited in claim 1, wherein the fourth medium-facing surface includes at least a seventh hole and an eighth hole.

6. The slider recited in claim 5, wherein a perimeter of a least one of the first hole or the second hole is larger than a perimeter of at least one of the seventh hole or the eighth hole.

7. The slider recited in claim 1, wherein a perimeter of the fourth hole is smaller than a perimeter of the third hole.

8. The slider recited in claim 1, wherein:
the second medium-facing surface further includes a seventh hole, and
the third medium-facing surface further includes an eighth hole.

9. The slider recited in claim 1, wherein the first medium-facing surface further includes a seventh hole and an eighth hole.

10. The slider recited in claim 1, wherein a shape of at least one of the first hole, the second hole, the third hole, or the fourth hole is cylindrical.

11. The slider recited in claim 1, wherein the first hole and the second hole are included in a pattern of at least 20 holes.

12. A data storage device, comprising:
the slider recited in claim 1; and
a recording medium,
wherein the slider is situated in the data storage device with the first medium-facing surface, the second medium-facing surface, the third medium-facing surface, and the fourth medium-facing surface facing the recording medium.

13. The data storage device recited in claim 12, further comprising helium between the slider and the recording medium, and wherein the data storage device is sealed to prevent the helium from escaping from an interior of the data storage device.

14. A slider comprising:
a leading pad with a first media-facing surface,
a first side pad with a second media-facing surface,
a second side pad with a third media-facing surface, and a trailing pad with a fourth media-facing surface,
wherein:
  the first media-facing surface does not intersect any of the second media-facing surface, the third media-facing surface, or the fourth media-facing surface,
  the first media-facing surface, the second media-facing surface, the third media-facing surface, and the fourth media-facing surface are at a same level,
  the slider includes at least six holes distributed among the first media-facing surface, the second media-facing surface, the third media-facing surface, and the fourth media-facing surface, and
  each of the first media-facing surface, the second media-facing surface, the third media-facing surface, and the fourth media-facing surface comprises at least one of the at least six holes.

15. The slider recited in claim 14, wherein a first volume of a first hole of the at least six holes differs from a second volume of a second hole of the at least six holes.

16. The slider recited in claim 15, wherein the first hole is situated in the first media-facing surface, and the second hole is situated in the second media-facing surface, the third media-facing surface, or the fourth media-facing surface, and wherein the first volume is larger than the second volume.

17. The slider recited in claim 15, wherein the first hole is situated in the first media-facing surface, and the second hole is situated in the first media-facing surface.

18. The slider recited in claim 15, wherein a third volume of a third hole of the at least six holes and the first volume are substantially identical.

19. The slider recited in claim 18, wherein the third hole is situated in the first media-facing surface.

20. The slider recited in claim 14, wherein:
  a first hole and a second hole of the at least six holes are situated in the first media-facing surface, and
  a third hole and a fourth hole of the at least six holes are situated in the fourth media-facing surface.

21. The slider recited in claim 20, wherein:
  a fifth hole of the at least six holes is situated in the second media-facing surface, and
  a sixth hole of the at least six holes is situated in the third media-facing surface.

22. The slider recited in claim 14, wherein at least two of the at least six holes have similar shapes in a Euclidean geometry sense.

23. A data storage device, comprising:
  a slider comprising:
    a leading pad with a first media-facing surface,
    a first side pad with a second media-facing surface,
    a second side pad with a third media-facing surface, and
    a trailing pad with a fourth media-facing surface; and
  a recording medium,
  wherein:
    the first media-facing surface does not intersect any of the second media-facing surface, the third media-facing surface, or the fourth media-facing surface,
    the first media-facing surface, the second media-facing surface, the third media-facing surface, and the fourth media-facing surface are at a same level,
    the slider includes at least six holes distributed among the first media-facing surface, the second media-facing surface, the third media-facing surface, and the fourth media-facing surface,
    each of the first media-facing surface, the second media-facing surface, the third media-facing surface, and the fourth media-facing surface comprises at least one of the at least six holes, and
    the at least six holes face the recording medium.

* * * * *